United States Patent
Gao et al.

(10) Patent No.: US 9,584,008 B2
(45) Date of Patent: Feb. 28, 2017

(54) SWITCHING POWER CONVERTER WITH ADAPTIVE POWER FACTOR CORRECTION

(71) Applicant: Dialog Semiconductor Inc., Campbell, CA (US)

(72) Inventors: Xiaolin Gao, Campbell, CA (US); Yimin Chen, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 23 days.

(21) Appl. No.: 14/752,700

(22) Filed: Jun. 26, 2015

(65) Prior Publication Data
US 2016/0380528 A1    Dec. 29, 2016

(51) Int. Cl.
*H02M 1/42*    (2007.01)
*H02M 3/335*   (2006.01)

(52) U.S. Cl.
CPC ......... *H02M 1/42* (2013.01); *H02M 3/33507* (2013.01)

(58) Field of Classification Search
CPC .. H02M 3/335; H02M 3/315; H02M 3/33546; H02M 3/33507; H02M 7/48; H02M 7/515
USPC ............. 363/21.1, 21.12, 21.01, 95, 97, 131
See application file for complete search history.

(56) References Cited

U.S. PATENT DOCUMENTS

| | | | |
|---|---|---|---|
| 9,455,636 B2* | 9/2016 | Gritti | H02M 3/33507 |
| 2005/0219871 A1 | 10/2005 | Li et al. | |
| 2010/0301821 A1* | 12/2010 | Kung | H02M 3/33523 323/283 |
| 2011/0110126 A1* | 5/2011 | Morrish | H02M 1/44 363/21.18 |
| 2011/0292704 A1* | 12/2011 | Makino | H02M 1/4208 363/126 |
| 2013/0077370 A1 | 3/2013 | Gu et al. | |
| 2014/0268909 A1* | 9/2014 | Digiacomo | H02M 3/33553 363/21.04 |
| 2016/0261199 A1* | 9/2016 | Adragna | H02M 1/42 |
| 2016/0276936 A1* | 9/2016 | Gritti | H02M 3/33507 |

FOREIGN PATENT DOCUMENTS

| | | |
|---|---|---|
| CN | 102332814 | 1/2012 |
| EP | 2688189 | 1/2014 |
| WO | WO 2009/156891 | 12/2009 |

* cited by examiner

*Primary Examiner* — Adolf Berhane
(74) *Attorney, Agent, or Firm* — Haynes and Boone, LLP (57) ABSTRACT

A switching power converter is provided that provides an adaptive power factor correction using a peak constant current mode and also a constant on time mode during each cycle of an input voltage.

14 Claims, 7 Drawing Sheets

SWITCHING POWER CONVERTER WITH ADAPTIVE POWER FACTOR CORRECTION

TECHNICAL FIELD

This application relates to switching power converters, and more particularly to a switching power converter with adaptive power factor correction.

BACKGROUND

A system's power factor relates to its efficiency because it is a ratio of the system's real power to its apparent power. For example, a non-linear load such as an electric motor presents a substantial amount of inductance to an AC power main. At startup, the input current must thus ramp up from zero whereas the AC voltage across the load continues to cycle with the AC power main voltage. The voltage and current into the load are thus out of phase with each other. A worst case with regard to power delivery occurs when the voltage and current are orthogonal to each other (90° out of phase) such that the power delivery is entirely reactive without any real power delivery. But apparent power is the magnitude of the product of the voltage and current (no phase dependence) such that such a device would continue to burn apparent power although the power factor would be zero. In contrast, a purely resistive load would produce no reactive power component such that the real power and the apparent power are equal, producing an optimal power factor of one. As the reactive power component increases, the power factor drops from one towards zero.

The power factor is thus an important parameter for a switching power converter such as a flyback converter as its transformer inevitably presents a non-linear load to the AC power main. It is thus conventional to implement power factor correction in a flyback power converter. For example, a diode bridge and capacitor may be used to provide a rectified input voltage for a flyback power converter. Despite the rectification, the input voltage will still have a sinusoidal profile for relatively small (and thus inexpensive) input capacitors. To obtain a high power factor, the peak current through the primary winding in the flyback converter's transformer should also have a similar sinusoidal profile. This peak current through the primary winding is proportional to a product of the input voltage and the on time ($t_{on}$) for the corresponding switching cycle in the flyback converter. The on time is proportional to a ratio of the peak primary winding current to the input voltage. If the peak primary winding current amplitude is tied to the input voltage (as it should be for a high power factor), one can thus readily see that a constant on time achieves a high power factor.

But the resulting constant on time causes an undesirable ripple in the flyback converter's output voltage. In that regard, it can be shown that the output power of a flyback converter is proportional to a square of a product of the input voltage and the on time. Since the input voltage varies sinusoidally, the output power (and hence the output voltage) also varies sinusoidally for constant on time power factor correction. The flyback converter must then use a relatively large output capacitor at the secondary side of the transformer to filter the output ripple, which raises costs. To achieve high power factor correction yet also provide a tightly regulated output voltage, it is thus conventional to use a multi-stage approach such as by processing the output voltage from the flyback converter through a DC-DC switching power converter. But such multi-stage approaches are expensive in terms of the extra components and increased control complexity. It is thus more economical to use a single-stage flyback converter architecture. But such users are then left with a choice of an improved power factor with a poorly-regulated output voltage or a tightly-regulated output voltage with a decreased power factor.

Accordingly, there is a need in the art for single-stage flyback converters with power factor correction and reduced output voltage ripple.

SUMMARY

A flyback switching power converter controller is provided with adaptive power factor correction. In this adaptive power factor correction, the controller institutes a period of constant peak current control and a period of constant switch on time control in each cycle of the input voltage. The flyback converter rectifies an AC main voltage to produce the rectified input voltage such that it still retains a rectified sinusoidal profile. The constant peak current control period may be centered about the sinusoidal peak in each cycle of the input voltage. In such embodiments, the controller would control a power switch for the flyback converter to have a constant on time during an initial portion of each input voltage cycle and during a final portion of each input voltage cycle.

Regardless of the relative timing of the constant on time periods versus the constant peak current period, the mixed usage of both these modes in each input voltage markedly reduces the resulting output voltage ripple at a cost of a relatively minor reduction in power factor. A suitably high power factor may thus be provided in combination with a relatively tightly regulated output voltage. These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To address the need in the art for improved power factor correction in a single-stage flyback converter with reduced output ripple, two different control modes are used across each cycle of the AC power main. During one portion of the AC power main cycle, the flyback converter uses a constant on time mode of operation. During a remaining portion of the AC power main cycle, the flyback converter uses a constant peak current mode of operation. The use of the constant on time mode during each AC power main cycle provides a high power factor but at the cost of relatively large output voltage ripple. Conversely, the use of the constant peak current mode of operation provides a tightly-regulated output voltage at the cost of a reduced power factor. The mixed mode operation thus provides an advantageous compromise between the conflicting goals of reducing the output voltage ripple and increasing the power factor.

The result is a power factor correction that is less than what would be achieved using a constant on time across the entire AC power main cycle. However, this reduction may be relatively mild such as resulting in a power factor of 0.7 instead of the nearly unitary value that a strict constant on time would provide. Such a relatively high power factor is perfectly adequate for low-power applications such as an LED driver. At the same time, the output voltage level regulation is substantially improved as compared to a strict constant on time mode of operation. Advantageously, the disclosed mixed-mode control provides the user an ability to select or tune the relative amounts of power factor correction and reduced output voltage ripple for a given application by varying the durations in each AC power main cycle dedicated to the constant on time mode period versus the constant peak current mode period.

The mixed mode control disclosed herein is independent of the control methodology traditionally used to achieve single-stage high power factor correction using a flyback converter. For example, it is conventional to achieve single-stage high power factor correction using either a constant on time feedback loop methodology or a constant peak current feedback loop. Both of these control methodologies may be modified to practice the mixed-mode control (adaptive power factor correction) disclosed herein. Constant peak current control embodiments will be discussed first followed by a discussion of constant on time embodiments.

Peak Current Feedback Control with Adaptive Power Factor Correction

Figure 1:
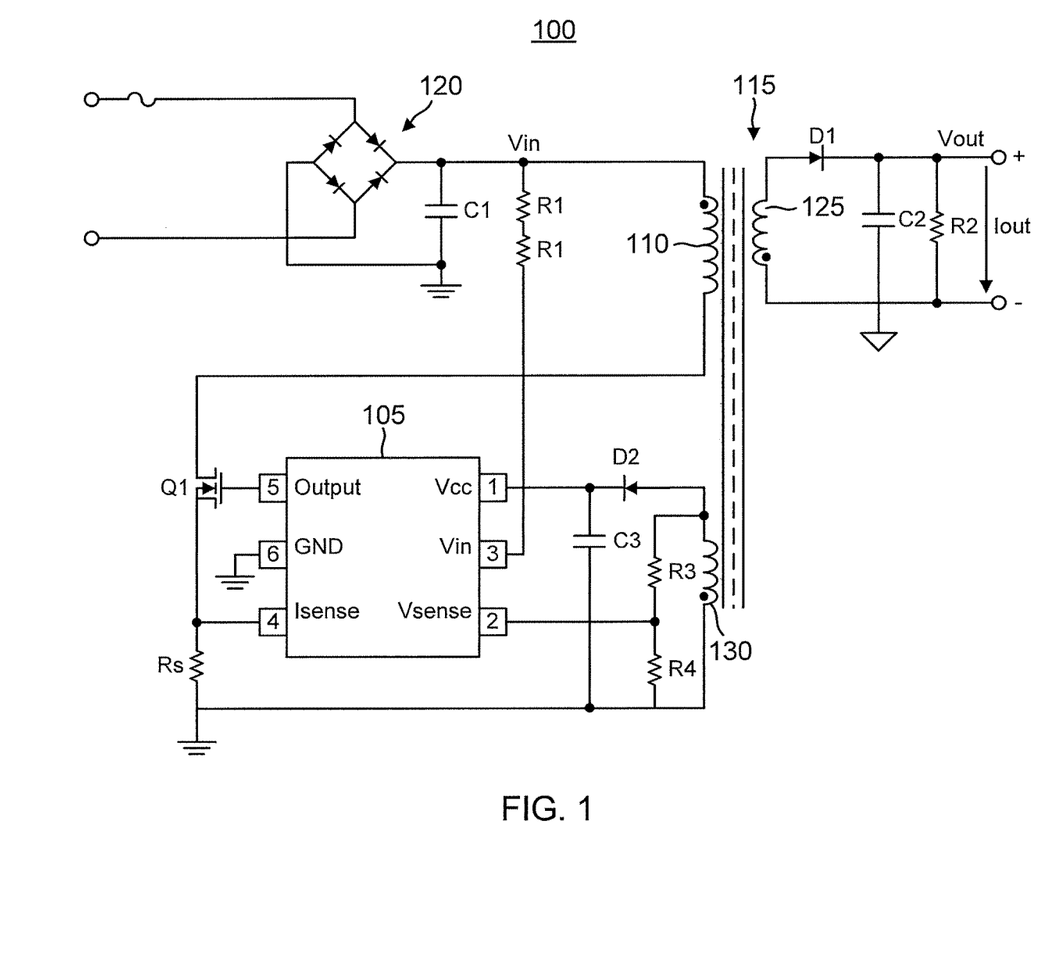
FIG. 1 illustrates an example flyback converter in accordance with an embodiment of the disclosure.

An example single-stage flyback converter 100 configured to implement adaptive power factor correction using a modified constant peak current feedback control loop is shown in FIG. 1. As will be explained further below, flyback converter 100 may also be modified to practice adaptive power factor correction using a modified constant on time feedback control loop. Flyback converter 100 is thus generic to both control methodologies. A controller integrated circuit 105 for flyback converter 100 controls the switching of a power switch such as an NMOS transistor Q1. In alternative embodiments, the power switch may be implemented using a bipolar junction transistor. Controller 105 controls a gate voltage for power switch transistor Q1 through an output pin 5. When switched on, power switch transistor Q1 allows a primary current to flow through a primary winding 110 of a transformer 115 responsive to an input voltage Vin. A rectifier 120 including a diode bridge and a capacitor C1 rectifies the alternating line voltage carried on an AC mains 125 to provide the input voltage Vin. In some embodiments, capacitor C1 is not an electrolytic capacitor such that it has a relatively small amount of capacitance. The input voltage Vin thus still retains a sinusoidal profile across each half of an AC main cycle.

For each cycle of power switch transistor Q1, the primary winding current ramps up from zero to a peak winding current value that depends upon the input voltage Vin, the switch on time, and the inductance for primary winding 110. When power switch transistor Q1 cycles off, a secondary winding current flows across a secondary winding 125 in transformer 115, starting from a peak value and continuing to ramp down to zero. An output capacitor C2 and a resistor R2 stabilize a resulting output voltage Vout produced by the secondary winding current. A diode D1 prevents the secondary winding current from flowing while the primary winding conducts. The secondary winding current produces a reflected voltage across primary winding 110 and also across an auxiliary winding 130 for transformer 115. Diode D1 will have a voltage drop across it that prevents a direct relationship between the reflected voltage and the output voltage while the secondary current still flows. But when the secondary current ramps to zero (the transformer reset time), there is no voltage drop across diode D1 such the resulting reflected voltage at that time is directly related to the output voltage. By sampling the reflected voltage across auxiliary winding 130 at the transformer reset time, controller 105 thus may determine the output voltage Vout as known in the primary-only feedback arts. For example, controller 105 may include a Vsense pin 2 that samples the reflected voltage across auxiliary winding 130 through a voltage divider formed by a pair of resistors R3 and R4. The reflected voltage may also be rectified through a diode D2 and a capacitor C3 to form a power supply voltage VCC received by controller 105 at a power pin 1.

Controller 105 may include a ground pin 6 and a current sense (Isense) pin 4 that samples the primary winding current through the voltage produced across a sampling resistor Rs coupled to a source of power switch transistor Q1. Since the input voltage Vin is proportional to a time rate of change of the primary winding current times the primary winding inductance, controller 105 may determine the input voltage Vin indirectly through the Isense pin voltage. However, controller 105 may also include a Vin pin 3 for directly sampling the input voltage Vin through one or more resistors R1.

Given the rectified sinusoidal profile for the input voltage Vin, the resulting primary winding current should also have a similar profile to provide a high power factor for flyback converter 100. Should controller 105 implement a constant on time for each cycle of power switch transistor Q1, the peak primary winding current will have a similar rectified sinusoidal profile across each cycle of the input voltage Vin (and hence across each half cycle of the AC main voltage) to provide a high power factor but at the cost of substantial output voltage ripple. Controller 105 is thus configured to practice an adaptive power factor correction in which both a constant on time mode of operation and a constant peak current mode of operation is used within each cycle of the input voltage Vin.

Figure 2:
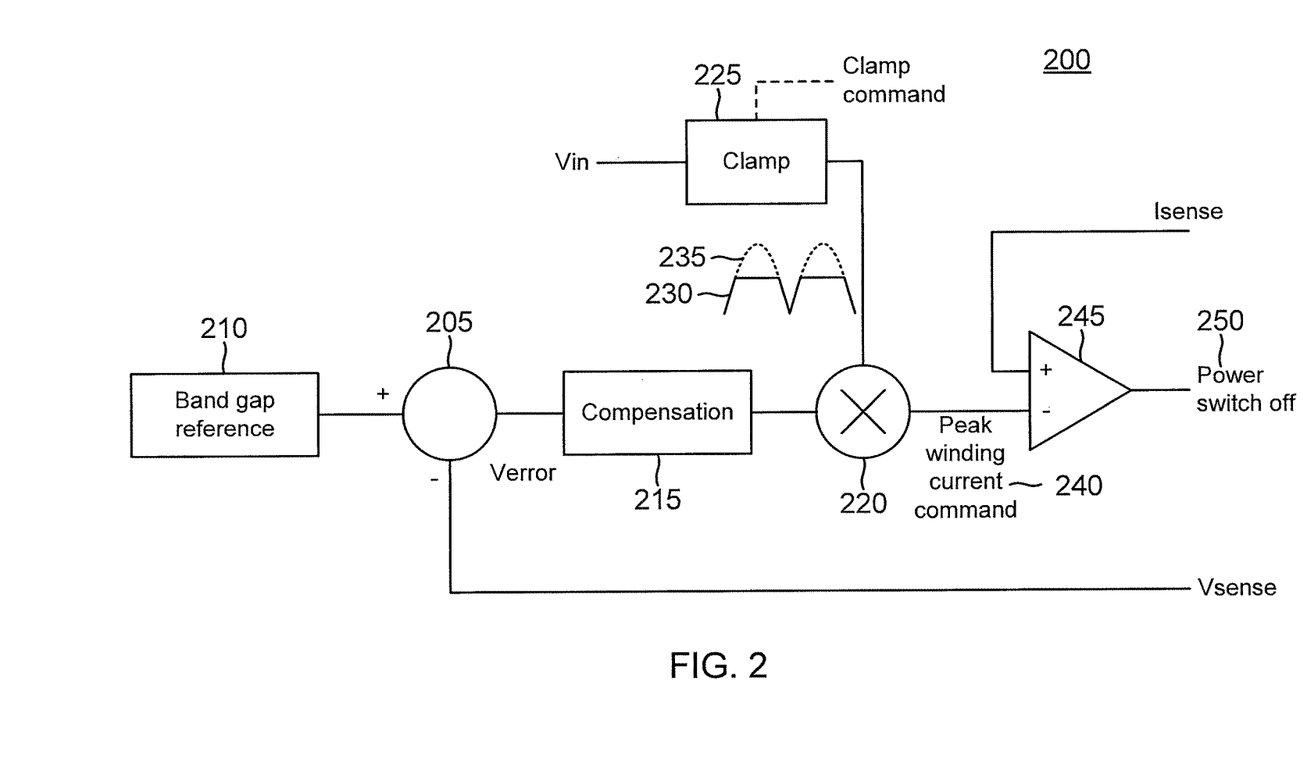
FIG. 2 illustrates an example constant peak current control feedback circuit with adaptive power factor correction for the controller of FIG. 1.

For example, controller 105 may include a first peak current control feedback circuit 200 as shown in FIG. 2. In first peak current control feedback circuit 200, a comparator 205 produces an error voltage (Verror) that equals the difference between a reference signal (e.g., a reference voltage such as produced by a band gap reference circuit 210) and a feedback signal (e.g., a feedback voltage Vsense as sampled at the transformer reset time). As discussed previously, the Vsense voltage has a direct relationship to the output voltage Vout for flyback converter 100 when sampled at the transformer reset time. After filtering through an compensation filter 215, the error voltage is multiplied with a clamped version 230 of the input voltage Vin in a multiplier 220. A voltage clamp circuit 225 clamps the input voltage Vin to produce clamped version 230, which may also be designated as a reference signal. A resulting peak winding current command 240 from multiplier 220 thus equals a product of the compensated error voltage and clamped version 230 of the input voltage Vin. A comparator 245 asserts a power switch off command 250 when Isense equals peak winding current command 240. Referring again to FIG. 1, recall that Isense represents the winding current. Since the power switch transistor Q1 will be turned off when Isense equals peak winding current command 240, first peak current control feedback circuit 200 controls the peak winding current in each cycle of the power switch transistor Q1.

Should the input voltage not be clamped, it will have a sinusoidal profile 235, which shows the two sinusoidal peaks produced in sinusoidal profile 235 for every cycle of the AC mains voltage. If multiplier 220 instead multiplies the compensated error voltage with Vin 235, a conventional constant time on mode of operation results using a peak current power factor correction feedback loop. In particular, note the peak primary winding current for a given power switch cycle is proportional to a product of the peak value for the input voltage Vin and the switch on time. The switch on time is thus proportional to a ratio of the peak primary winding current and the peak input voltage Vin. Since the peak primary winding current is tied to the peak input voltage through the multiplication, such a conventional peak current power factor correction feedback loop results in a constant on time for each power switch switching cycle. But the multiplication with clamped input voltage 235 only produces the constant on time mode of operation during the portions of each input voltage cycle that are not clamped.

During the clamped portion of a cycle for clamped input voltage 230, peak winding current command 240 is substantially constant. But input voltage 235 continues to peak sinusoidally during these clamped periods. Starting from a beginning time for each clamped period, the on time for successive power switch cycles will thus be shorter and shorter until a minimum on time is reached when input voltage 235 reaches its peak value. The switch on time for successive power switch cycles will then begin to increase until the end of the clamped portion in the cycle for clamped input voltage 230 is reached. It may thus be seen that the switch on time is inversely proportional to input voltage 235 during each clamped portion of clamped input voltage 230 such that the product of input voltage 235 and the on time is substantially constant. Since the output power for flyback converter 100 is proportional to a square of this product, the constant peak current mode of operation during each clamped period substantially reduces output voltage ripple as compared to conventional constant on time peak primary winding current control techniques. Such output voltage ripple reduction comes at the cost of a reduced power factor since input voltage 235 is varying across the clamped portion whereas the peak primary winding current is maintained constant. But as discussed previously, numerous applications such as an LED driver operate satisfactorily at lower power factors. Moreover, the resulting power factor from the adaptive power factor correction provided by first peak current control feedback circuit 200 is much better than what would be achieved if the primary winding current were maintained constant across the entire cycle of input voltage 235.

Figure 3:
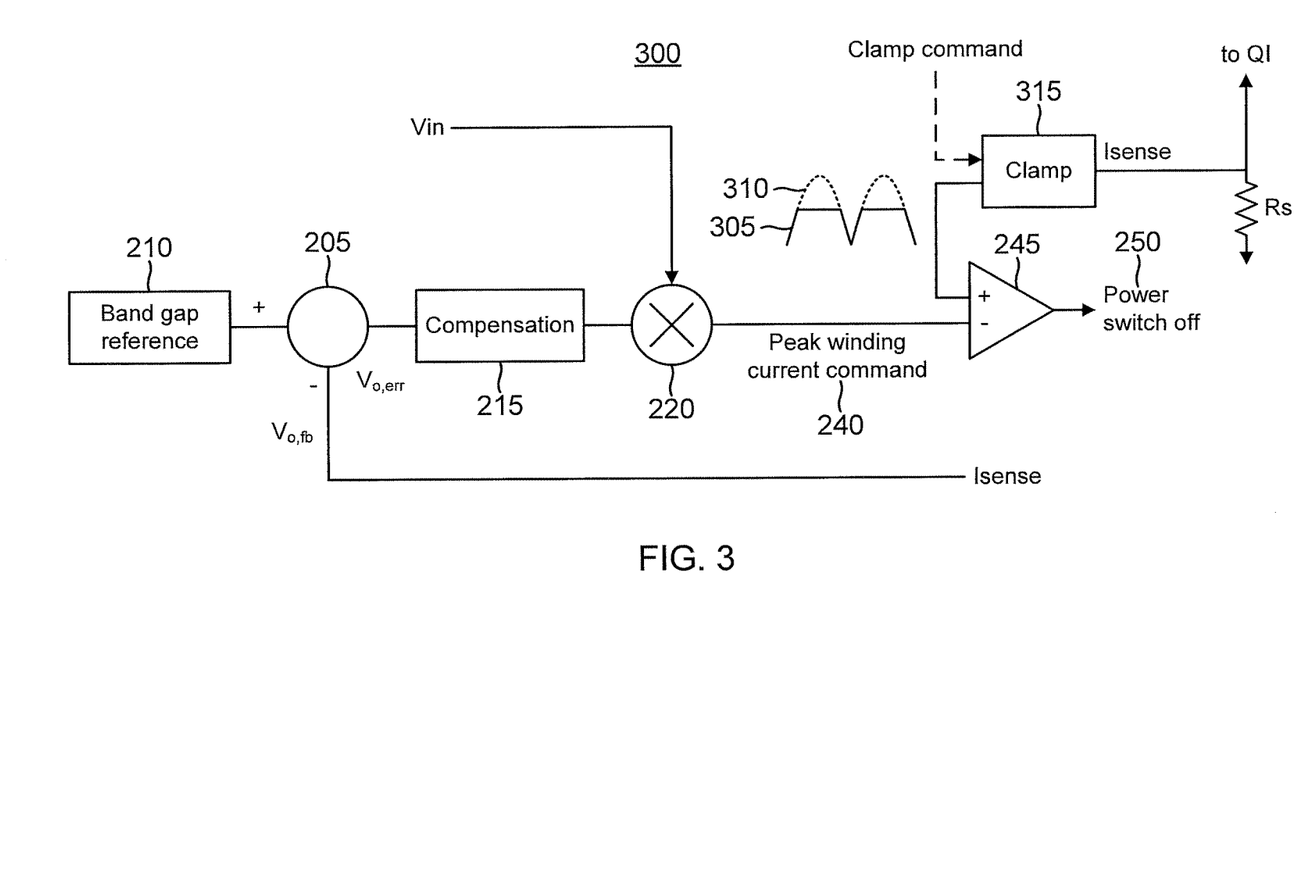
FIG. 3 illustrates another example constant peak current control feedback circuit with adaptive power factor correction for the controller of FIG. 1.

Rather than clamping the input voltage Vin, the Isense voltage may be clamped to provide an adaptive power factor correction. For example, controller 105 may include a second peak current control feedback circuit 300 as shown in FIG. 3. Band gap reference circuit 210, comparator 245, multiplier 220, compensation filter 215, and comparator 205 all function as discussed with regard to first peak current control feedback circuit 200. However, note that the input voltage Vin is no longer clamped. Instead, the Isense voltage 310 is clamped analogously by a voltage clamp circuit 315 to produce a clamped Isense voltage 305 received by comparator 245. In that regard, it is conventional to clamp the Isense voltage 310 to provide over-current protection. But such conventional clamping occurs at a peak voltage level that exceeds that produced by the peak primary winding current during normal operation. In contrast, voltage clamp circuit 315 clamps the Isense voltage 310 at a level that is less than the peak Isense voltage produced by the peak primary winding current during normal operation. Moreover, in an over-current condition, a flyback converter will typically reset or shut down whereas controller 105 continues to cycle the power switch transistor Q1 despite the clamping of Isense voltage 310 to produce clamped Isense voltage 305 in second peak current control feedback circuit 300. Comparing first peak current control feedback circuit 200 with second peak current control feedback circuit 300, it may be seen that in both embodiments a clamp circuit is used to clamp a signal selected from a group consisting of a reference signal (e.g., clamped version 230) or an Isense signal.

Figure 4:
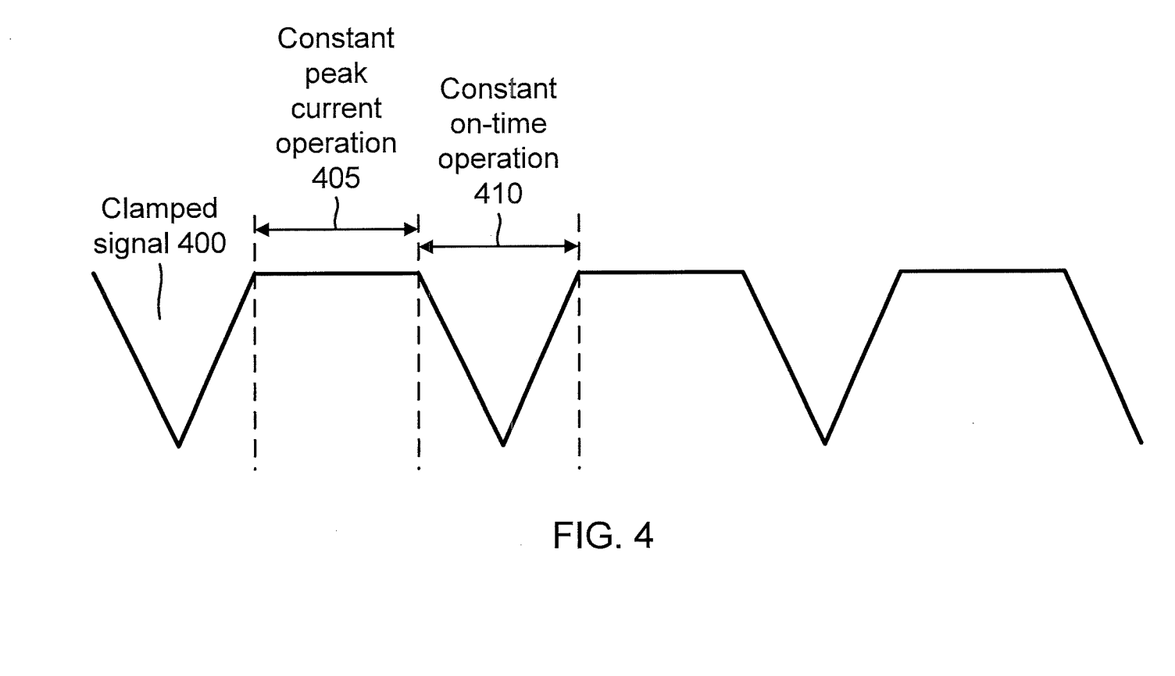
FIG. 4 illustrates a clamped signal waveform for the feedback circuits of FIGS. 2 and 3.

Regardless of whether the adaptive feedback control is achieved using first peak current control feedback circuit 200 or second peak current control feedback circuit 300, the peak current control uses a clamped signal representative of the input voltage Vin. In other words, the clamped signal has a rectified sinusoidal profile in the absence of clamping that is in-phase with the input voltage Vin. Referring again to FIG. 2, clamped version 230 of the input voltage Vin need not be derived directly from the input voltage Vin but instead could be a synthesized waveform. The synthesis would simply need to be synchronous with each cycle of the input voltage Vin. Similarly, clamped Isense voltage 305 in constant peak current control feedback circuit 300 need not be derived from Isense voltage 310 but instead could be synthesized so long as the resulting clamped waveform is synchronous with each cycle of the input voltage Vin. Regardless of how the clamped signal (Vin or Isense) is generated, the resulting mixed operation modes are as shown in FIG. 4 for a clamped signal 400. During each clamped portion of clamped signal 400, a period 405 of constant peak current operation occurs. Similarly, during each non-clamped portion in which the clamped signal resumes its rectified sinusoidal profile, a period 410 of constant on time operation results. Referring again to FIGS. 2 and 3, voltage clamp circuit 225 and voltage clamp circuit 315 may each have their respective clamping voltage levels being responsive to a clamp command such that the respective percentages of when flyback converter 100 operates in a constant peak current mode or a constant on time mode may be tuned accordingly. This tuning may be performed automatically by controller 105 responsive to operating conditions or may be responsive to a user's command.

Figure 5:
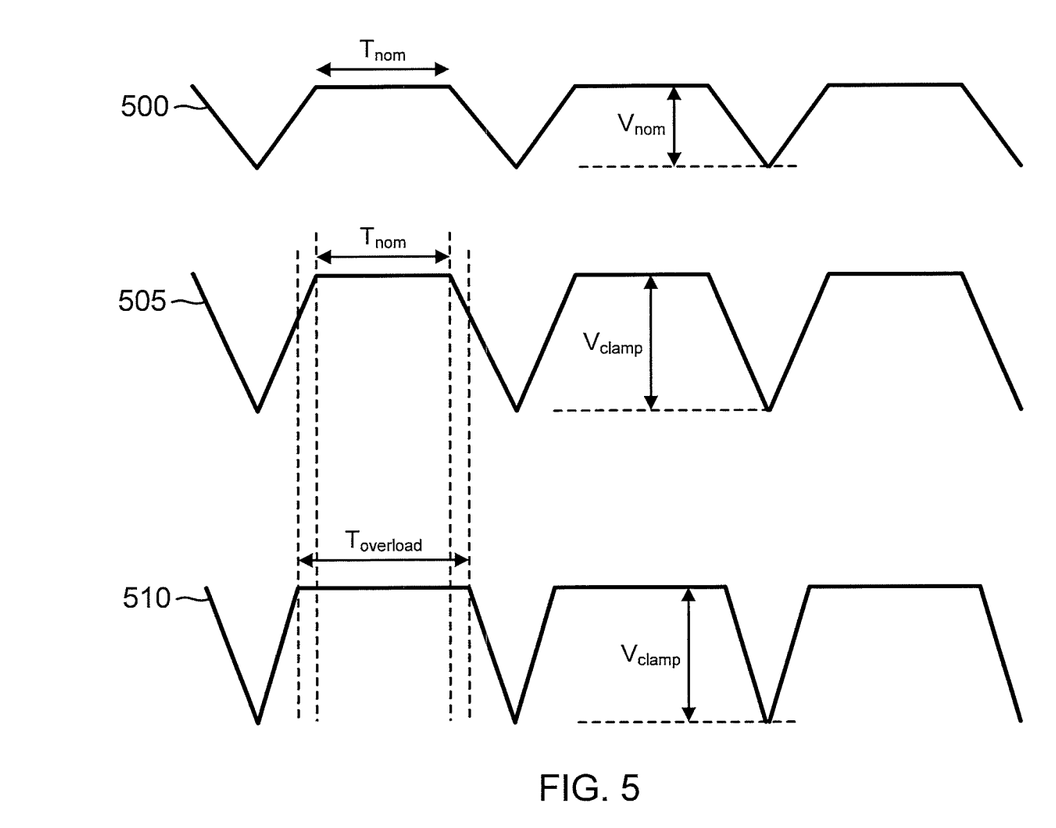
FIG. 5 illustrates the clamped signal waveforms for the feedback circuits of FIGS. 2 and 3 under a light load condition, a heavy load condition, and an overload condition.

In embodiments in which the clamping voltage level is controlled by controller 105, the Verror voltage may be used to determine the load level such the clamping level is scaled proportional to the determined load level. The resulting clamped signal is shown in FIG. 5. A first clamped signal 500 represents a low load condition in which the clamping voltage is lowered to a nominal value (Vnom). As the load is increased, controller 105 continues to increase the clamping voltage level until a maximum value (Vclamp) is reached as shown for a second clamped signal 505 (a high load condition). At this point, no further increases in the clamping voltage level can be achieved such that the feedback loop can only supply more power by increasing the percentage of time in which the constant peak current mode of operation is used as shown for a third clamped signal 510. This provides an ability to detect an over-current condition, which is especially useful for second peak current control feedback circuit 300 since a conventional over-voltage clamp is replaced by voltage clamp circuit 315. In that regard, the constant peak current period in each cycle of the clamped signals has a nominal duration (Tnom). As this duration is exceeded for third clamped signal 510, an overload condition may be detected accordingly.

Constant on Time Feedback Control with Adaptive Power Factor Correction

Figure 6:
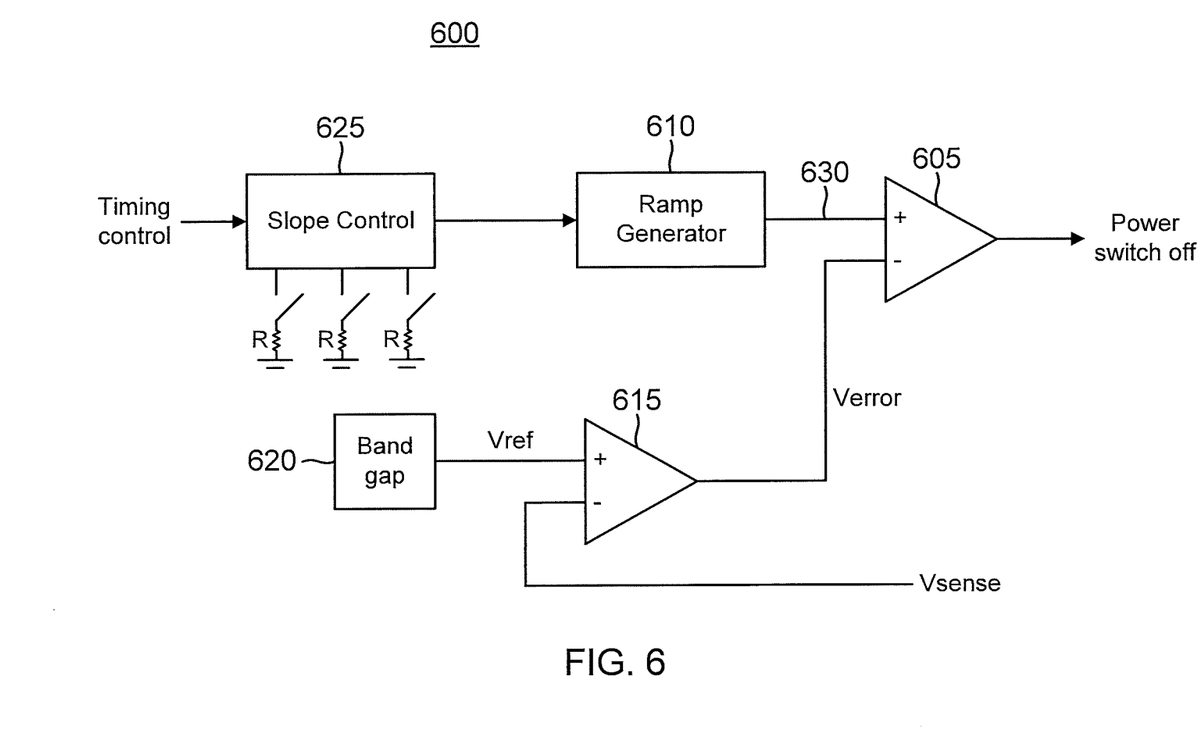
FIG. 6 illustrates an example constant on time control feedback circuit with adaptive power factor correction for the controller of FIG. 1.

An example constant on time feedback circuit 600 with adaptive power correction is shown in FIG. 6. A first comparator 605 such as a differential amplifier receives a ramped voltage (or current) signal 630 from a ramp generator 610. A second comparator 615 (which also may comprise a differential amplifier) provides an error signal (Verror) to first comparator 605 based upon the difference between a reference voltage Vref and the Vsense signal. A suitable reference voltage generator such as a band gap reference circuit 620 may be used to provide the reference voltage Vref. If ramp generator 610 generated the ramp voltage using a constant slope, a conventional constant on time control loop results. This is so because the error signal Verror may be considered to be relatively constant over any given cycle of the input voltage Vin. The comparison of a constant slope ramp signal with the relatively static error signal Verror will thus produce a constant on time for each cycle of the power switch transistor Q1 as is conventional to result in a high power factor at the cost of relatively high output voltage ripple. To provide markedly reduced voltage ripple (e.g., a reduction of 50%) while still providing a relatively high power factor such as 0.7 or greater), a slope control module 625 varies a slope for ramp generator 610 over a constant peak current mode of operation in each cycle of the input voltage Vin. Slope control module 625 maintains the slope constant over a remaining portion of each cycle of the input voltage Vin. A compensation filter (not illustrated) may be used to filter error signal Verror to prevent constant on time feedback circuit 600 from responding to the slope modulation provided by slope control module 625. Alternatively, the bandwidth of comparator 615 may be made relatively low to provide the desired compensation.

Figure 7:
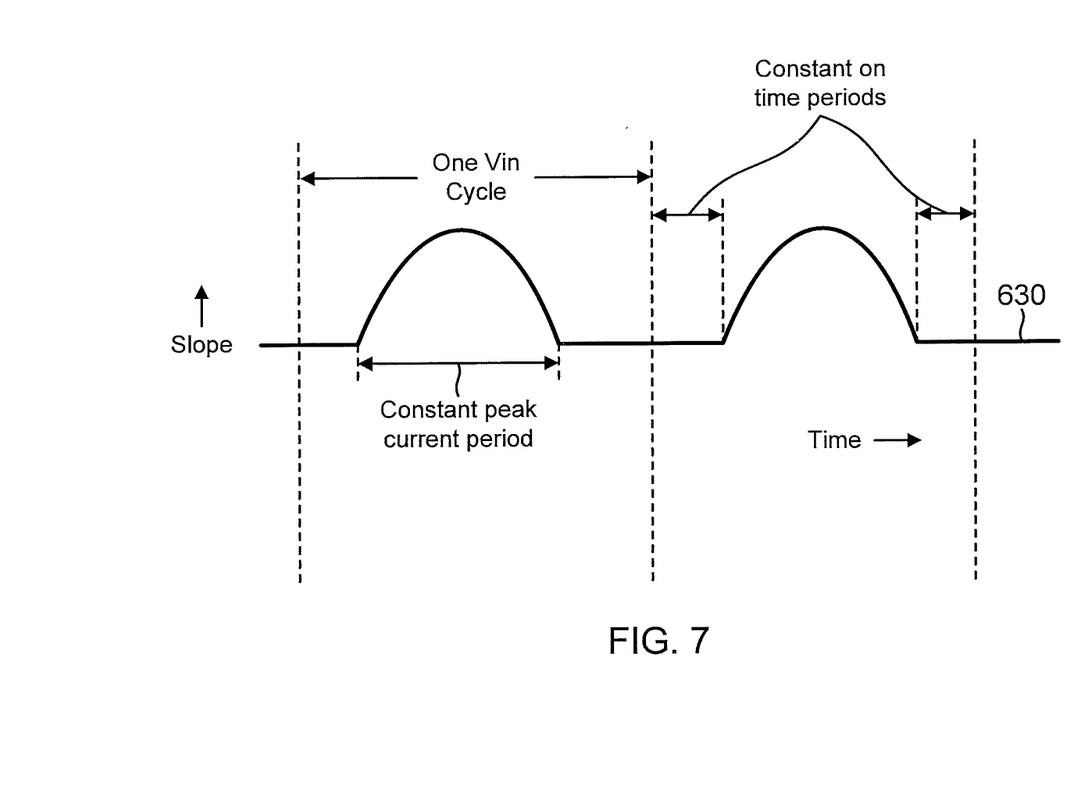
FIG. 7 illustrates the ramp slope waveform for two cycles of the input voltage for the feedback circuit of FIG. 6.

A resulting waveform for ramp signal 630 may be as shown in FIG. 7. In each cycle of the input voltage Vin (and thus each ramp slope cycle), the ramp slope is maintained constant over an initial constant on time period and a final constant on time period. In between these two periods, the slope is sinusoidally peaked in each ramp slope cycle. During these peaking portions, the increasing ramp slope results in shorter and shorter switch on times until a shortest switch on time is reached. The switch on times would then be increased until the ramp slope is again made constant. The switch on times during the sinusoidally peaked portion of each ramp slope cycle are thus consistent with a constant peak current mode of operation. The remaining constant slope portions of each ramp slope cycle correspond to a constant on time mode of operation. With regard to synchronizing the generation of the constant slope periods with the constant peak current period in each ramp slope cycle, slope control module 625 may receive a timing command derived from the cycling of the input voltage Vin. In addition, controller 105 may command slope control module 625 to vary the relative proportions of the constant peak current portion as compared to the constant on time portions in each ramp slope period responsive to changing load conditions analogously as discussed with regard to FIG. 5. Slope control module 625 may generate the changing ramp slope command using, for example, selectable resistors R. Moreover, the changing ramp slope may be conducted in a piece-wise linear fashion that approximates the desired sinusoidal profile during the constant peak current periods.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A flyback converter controller, comprising:
    a multiplier configured to multiply an error signal with a reference signal to produce a peak current command signal;
    a comparator configured to compare the peak current command signal corresponding to a desired peak value for a primary winding current to an Isense signal that represents a primary winding current amplitude, the comparator configured to generate a power switch off command responsive to an amplitude for the primary winding current equaling the desired peak value, and
    a clamp circuit configured to clamp a signal selected from the reference signal and the Isense signal such that a peak value for the primary winding current amplitude is maintained constant for a constant peak current period of each cycle of an input voltage and such that a power switch on time is maintained constant in a remaining constant on time period of each cycle of the input voltage.

2. The flyback controller of claim 1, wherein the clamp circuit is configured to clamp the reference signal during each constant peak current period, and wherein the reference signal is proportional to a rectified sinusoidal profile for the input voltage during each constant on time period.

3. The flyback controller of claim 2, further comprising an error signal generator configured to compare a feedback signal representative of an output voltage to a reference voltage to generate the error signal.

4. The flyback controller of claim 3, further comprising a band gap reference circuit configured to generate the reference voltage as a band gap reference voltage.

5. The flyback controller of claim 3, wherein the error signal generator further comprises a compensation filter configured to filter the error signal.

6. The flyback controller of claim 3, wherein the flyback controller is configured to vary a a duration of the constant peak current period responsive to a load level.

7. The flyback controller of claim 1, wherein the flyback controller is further configured to trigger an over-current condition responsive to the duration of the constant peak current period exceeding a threshold value.

8. The flyback controller of claim 1, wherein the clamp circuit is configured to clamp the Isense signal, and wherein the peak value for the primary winding current is less than a over-current peak value for the primary winding current.

9. The flyback controller of claim 1, wherein the flyback controller is incorporated into a flyback converter including the power switch, and wherein the power switch comprises a MOSFET transistor.

10. The flyback controller of claim 1, wherein the flyback controller is incorporated into a flyback converter including the power switch, and wherein the power switch comprises a bipolar junction transistor.

11. A flyback controller, comprising:
an error signal generator configured to generate an error signal that is proportional to a difference between a reference signal and a feedback signal;
a ramp generator configured to cyclically generate a ramp signal;
a comparator configured to switch off a power switch responsive to the ramp signal equaling the error signal; and
a ramp slope control circuit configured to control a ramp slope for the ramp signal such that the ramp slope has a substantially sinusoidally peaked period for each cycle of an input voltage and such that the ramp slope is maintained constant during a remaining portion of each cycle of the input voltage.

12. The flyback controller of claim 11, further comprising a band gap reference circuit configured to generate the reference signal as a band gap reference voltage.

13. The flyback controller of claim 11, wherein the ramp slope control is further configured to control the ramp slope by selecting from a plurality of selectable resistors to generate a ramp slope command.

14. The flyback controller of claim 11, wherein the ramp slope control circuit is further configured to control the ramp slope such that the substantially sinusoidally peaked period is a piecewise linear period.

* * * * *